United States Patent [19]
Smith

[11] 3,873,618
[45] Mar. 25, 1975

[54] 1-[4-(4-ACETAMIDOPHENYL)PHENOXY]-3-ISOPROPYL-2-PROPANOL

[75] Inventor: Leslie Harold Smith, Macclesfield, England

[73] Assignee: Imperial Chemical Industries Limited, London, England

[22] Filed: July 18, 1969

[21] Appl. No.: 843,177

[52] U.S. Cl............ 260/562 P, 260/348 A, 424/324
[51] Int. Cl............................................... C07c 103/28
[58] Field of Search...................................... 260/562

[56] References Cited
UNITED STATES PATENTS
3,408,387   10/1968   Howe et al...................... 260/562

*Primary Examiner*—Harry I. Moatz
*Attorney, Agent, or Firm*—Cushman, Darby & Cushman

[57] ABSTRACT

The disclosure relates to 1-amino-3-bicyclicaryloxy-2-propanol derivatives, to processes for their manufacture and to pharmaceutical compositions containing them. The compounds possess $\beta$-adrenergic blocking activity and are useful for the treatment of heart diseases. Representative of the compounds disclosed are 1-(5-propionamidonaphth-1-yloxy)-3-t-butylamino-2-propanol and 1-[4-(4-acetamidophenyl)phenoxy]-3-isopropylamino-2-propanol and the acid-addition salts thereof.

1 Claim, No Drawings

1-[4-(4-ACETAMIDOPHENYL)PHENOXY]-3-ISO-PROPYL-2-PROPANOL

This invention relates to new amine derivatives which possess β-adrenergic blocking activity and which are therefore useful in the treatment or prophylaxis of heart diseases, for example angina pectoris and cardiac arrhythmias, and in the treatment of hypertension and phaeochromocytoma, in man.

According to the invention we provide amine derivatives of the formula:

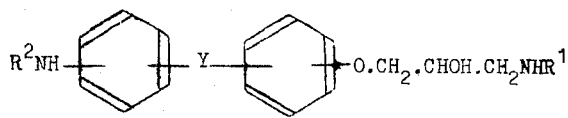

wherein $R^1$ stands for an alkyl radical, wherein $R^2$ stands for an acyl radical, and wherein Y stands for a direct link such that the two benzene rings together with Y form a biphenylyl radical, or Y stands for a fusion link such that the two benzene rings together with Y form a naphthalene ring, and the acid-addition salts thereof.

It is to be understood that the above definition of amine derivatives encompass all possible stereoisomers thereof, and mixtures thereof.

As a suitable value for $R^1$ there may be mentioned, for example, a branched-chain alkyl radical of up to 6 carbon atoms, for example the isopropyl or t-butyl radical.

As a suitable value for $R^2$ there may be mentioned, for example, an alkanoyl radical of up to 6 carbon atoms, for example the acetyl or propionyl radical.

Particularly valuable amine derivatives of the invention have the formula:

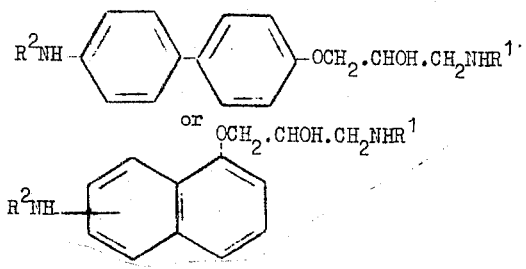

wherein $R^1$ and $R^2$ have the meanings stated above, and preferred compounds having the latter formula have the $R^2NH$- group in the 5- or 6- position of the naphthalene nucleus relative to the side-chain.

As suitable acid-addition salts of the amine derivatives of the invention there may be mentioned, for example, salts derived from inorganic acids, for example hydrochlorides, hydrobromides, phosphates or sulphates, or salts derived from organic acids, for example oxalates, lactates, tartrates, acetates, salicylates, citrates, benzoates, β-naphthoates, adipates or 1,1-methylene-bis-(2-hydroxy-3-naphthoates), or salts derived from acidic synthetic resins, for example sulphonated polystyrene resins, for example "Zeo-Karb" 225 (Zeo-Karb is a Trade Mark).

Specific compounds of the present invention are, for example, 1-(5-acetamidonaphth-1-yloxy)-3-isopropylamino-2-propanol;
1-[4-(4-acetamidophenyl)phenoxy]-3-isopropylamino-2-propanol;
3-isopropylamino-1-(5-propionamidonaphth-1-yloxy)-2-propanol;
1-(5-propionamidonaphth-1-yloxy)-3-t-butylamino-2-propanol;
3-isopropylamino-1-(6-propionamidonaphth-1-yloxy)-2-propanol and
1-(6-propionamidonaphth-1-yloxy)-3-t-butylamino-2-propanol and the acid addition salts thereof, and of these, particularly preferred compounds are 1-(5-propionamidonaphth-1-yloxy)-3-t-butylamino-2-propanol and its acid-addition salts.

According to a further feature of the invention we provide a process for the manufacture of the amine derivatives of the invention and the acid-addition salts thereof, which comprises the interaction of a compound of the formula:

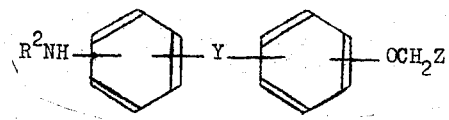

wherein $R^2$ and Y have the meanings stated above, and wherein Z stands for the group

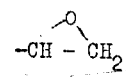

or the group $-CHOH.CH_2Z^1$, wherein $Z^1$ stands for a halogen atom, or of mixtures of such compounds wherein Z has both meanings stated above, with an amine of the formula $NH_2R^1$, wherein $R^1$ has the meaning stated above, whereafter if desired the product in free base form is reacted with an acid in order to form an acid-addition salt thereof.

As a suitable value for $Z^1$ there may be mentioned, for example, a chlorine or bromine atom. The interaction may be carried out at ambient temperature or it may be accelerated or completed by the application of heat, for example by heating to a temperature of up to 110°C.; it may be carried out at atmospheric or at an elevated pressure, for example by heating in a sealed vessel; and it may be carried out in an inert diluent or solvent, for example methanol or ethanol, or an excess of the amine of the formula $NH_2R^1$, wherein $R^1$ has the meaning stated above, may be used as diluent or solvent.

The starting material used in the above process may be obtained by the interaction of the corresponding phenol with an epihalohydrin, for example epichlorohydrin. The said starting material may be isolated or it may be prepared and used in situ without isolation.

As stated above, the amine derivatives of the present invention are likely to be of value in the treatment or prophylaxis of heart diseases. Furthermore, the particularly preferred compound of the invention, 1-(5-propionamidonaphth-1-yloxy)-3-t-butylamino-2-propanol, has β-adrenergic blocking activity of the same order as that of propranolol, and like propranolol is devoid of intrinsic sympathomimetic activity. However, unlike propranolol, this compound is devoid of significant local anaesthetic properties, and it may therefore be used more conveniently than propranolol in the treatment of ocular diseases such as glaucoma.

According to a further feature of the invention, therefore, we provide pharmaceutical compositions comprising as active ingredient one or more amine derivatives of the invention, or acid-addition salts thereof, in association with a pharmaceutically acceptable diluent or carrier therefor.

As suitable compositions there may be mentioned, for example, tablets, capsules, aqueous or oily solutions or suspensions, emulsions, injectable aqueous or oily solutions or suspensions, and dispersible powders.

The pharmaceutical compositions of the invention may contain, in addition to the amine derivatives of the invention, one or more additional drugs selected from sedatives, for example phenobarbitone, meprobamate and chlorpromazine; vasodilators, for example glyceryl trinitrate, pentaerythritol tetranitrate and isosorbide dinitrate; diuretics, for example chlorothiazide; hypotensive agents, for example reserpine, bethanidine and guanethidine; myocardial depressants, for example quinidine; and agents used in the treatment of Parkinson's disease, for example benzhexol.

It is expected that the preferred compounds would be given to man at an oral dose of between 20 mg. and 400 mg. daily, at doses spaced at 4–6 hourly intervals, or at an intraveous dose of between 1 mg. and 20 mg. daily. Preferred oral dosage forms are tablets or capsules containing between 10 and 100 mg., and preferably 10 mg. or 40 mg. of active ingredient. Preferred intravenous dosage fors are sterile aqueous solutions of non-toxic acid-addition salts of the amine derivatives, containing between 0.5% and 1% w/v of active ingredient, and more particularly containing 0.1% w/v of active ingredient.

The invention is illustrated but not limited by the following Examples in which the parts are by weight:

EXAMPLE 1

A mixture of 2.5 parts of 3-(5-acetamidonaphth-1-yloxy)-1,2-epoxypropane, 25 parts of isopropylamine and 25 parts of ethanol is heated under reflux for 3 hours. The mixture is evaporated to dryness under reduced pressure and the residue is stirred with 50 parts of ethyl acetate and extracted twice with 50 parts of aqueous N-hydrochloric acid each time. The combined acidic extracts are treated with carbon, the mixture is filtered, and the filtrate is basified with aqueous 11N-sodium hydroxide solution. The mixture is filtered and the solid residue is washed with water, dried and crystallised from a mixture of 10 parts of ethyl acetate and 5 parts of ethyl methyl ketone. There is thus obtained 1-(5-acetamidonaphth-1-yloxy)-3-isopropylamino-2-propanol, m.p. 160°–162°C.

The 3-(5-acetamidonaphth-1-yloxy)-1,2-epoxypropane used as starting material may be obtained as follows:

5.4 Parts of epichlorohydrin are added to a stirred solution of 2.9 parts of 5-acetamidonaphth-1-ol, and 0.7 part of sodium hydroxide in 50 parts of water which is maintained at 15°C. The mixture is stirred for 6 hours and then filtered. The solid residue is washed with water and dried, and there is thus obtained 3-(5-acetamidonaphth-1-yloxy)-1,2-epoxypropane, m.p. 106°C.

EXAMPLE 2

A mixture of 2 parts of 1-[4-(4-acetamidophenyl)phenoxy]-3-chloro-2-propanol, 20 parts of isopropylamine and 10 parts of ethanol is heated in a sealed vessel at 100°C. for 10 hours. The mixture is evaporated to dryness and the residue is stirred with 50 parts of aqueous N-hydrochloric acid. The mixture is filtered and the filtrate is basified with aqueous 11N-sodium hydroxide solution. The mixture is filtered and the solid residue is washed with water, dried and crystallised from ethyl acetate. There is thus obtained 1-[4-(4-acetamidophenyl)phenoxy]-3-isopropylamino-2-propanol, m.p. 152°–154°C.

The 1-[4-(4-acetamidophenyl)phenoxy]-3-chloro-2-propanol used as starting material may be obtained as follows:

A mixture of 2.2 parts of 4-(4-acetamidophenyl)phenol, 5 parts of epichlorohydrin and 0.1 part of piperidine is heated at 90°C. for 18 hours. The mixture is cooled and 50 parts of ethanol are added. The mixture is then filtered and the filtrate is evaporated to dryness under reduced pressure. The residue consists of 1-[4-(4-acetamidophenyl)phenoxy]-3-chloro-2-propanol.

EXAMPLE 3

A mixture of 4.0 parts of 1,2-epoxy-3-(5-propionamidonaphth-1-yloxy)propane, 25 parts of isopropylamine and 25 parts of methanol is kept at ambient temperature for 18 hours. The mixture is evaporated to dryness under reduced pressure, the residue is stirred with 50 parts of ethyl acetate and the mixture is extracted twice with 50 parts of aqueous N-hydrochloric acid each time. The combined acidic extracts are basified with aqueous 11N-sodium hydroxide solution, the mixture is filtered and the solid residue is washed with water, dried and crystallised from a mixture of 1 part of isopropanol and 5 parts of ethyl acetate. There is thus obtained 3-isopropylamino-1-(5-propionamidonaphth-1-yloxy)-2-propanol, m.p. 172°–174°C.

The 1,2-epoxy-3-(5-propionamidonaphth-1-yloxy)propane used as starting material may be obtained as follows:

A mixture of 6.4 parts of 5-amino-1-naphthol, 12 parts of propionic anhydride and 100 parts of water is heated at 90°C. for 2 hours. The mixture is cooled and filtered and the solid residue is washed with water, dried and crystallised from ethyl acetate. There is thus obtained 5-propionamido-1-naphthol, m.p. 176°C.

A mixture of 6.45 parts of 5-propionamido-1-naphthol, 7.0 parts of epichlorohydrin, 50 parts of ethanol, 5 parts of water and 1.2 parts of sodium hydroxide is heated under reflux for 3 hours. The mixture is evaporated to dryness and the residue consists of 1,2-epoxy-3-(5-propionamidonaphth-1-yloxy)propane.

EXAMPLE 4

The process described in Example 3 is repeated except that 25 parts of t-butylamine are used in place of the 25 parts of isopropylamine. There is thus obtained 1-(5-propionamidonaphth-1-yloxy)-3-t-butylamino-2-propanol, m.p. 128°–130°C.

EXAMPLE 5

The process described in Example 3 is repeated except that 6.75 parts of 1,2-epoxy-3-(6-propionamidonaphth-1-yloxy)propane are used in place of the 4.0 parts of 1,2-epoxy-3-(5-propionamidonaphth-1-yloxy)propane. There is thus obtained 3-isopropylamino-1-(6-propionamidonaphth-1-yloxy)-2-propanol, m.p. 120°–122°C.

The 1,2-epoxy-3-(6-propionamidonaphth-1-yloxy)propane used as starting material may be obtained in an analogous manner to that described in Example 3 for the preparation of 1,2-epoxy-3-(5-propionamidonaphth-1-yloxy)propane by using 6-amino-1-naphthol in place of 5-amino-1-naphthol. The 6-proppionamido-1-naphthol obtained as intermediate is used without purification.

EXAMPLE 6

The process described in Example 5 is repeated except that 25 parts of t-butylamine are used in place of the 25 parts of isopropylamine, and that the compound in free base form is converted into its hydrochloride by conventional means. There is thus obtained 1-(6-propionamidonaphth-1-yloxy)-3-t-butylamino-2-propanol hydrochloride, m.p. 230°C. (with decomposition).

What we claim is:

1. An amine derivative selected from 1-[4-(4-acetamidophenyl)phenoxy]-3-isopropylamino-2-propanol and the non-toxic, pharmaceutically acceptable acid-addition salts thereof.

* * * * *